United States Patent
Baba

(10) Patent No.: US 8,320,017 B2
(45) Date of Patent: Nov. 27, 2012

(54) COLORIMETRIC METHOD, COLORIMETRIC APPARATUS, AND RECORDING MEDIUM

(75) Inventor: Kenji Baba, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 690 days.

(21) Appl. No.: 12/505,019

(22) Filed: Jul. 17, 2009

(65) Prior Publication Data

US 2010/0053647 A1    Mar. 4, 2010

(30) Foreign Application Priority Data

Aug. 28, 2008 (JP) ................................. 2008-220497

(51) Int. Cl.
*H04N 1/40* (2006.01)
(52) U.S. Cl. .......................................... 358/1.9; 358/504
(58) Field of Classification Search .................. 358/2.1, 358/1.9, 504, 406, 515–520, 523, 527, 468, 358/500; 356/72, 402, 407, 417
See application file for complete search history.

(56) References Cited

U.S. PATENT DOCUMENTS 7,502,099 B2 * 3/2009 Imura ............................. 356/72
7,675,620 B2 * 3/2010 Imura ........................... 356/402

FOREIGN PATENT DOCUMENTS

JP        2004-64112        2/2004

OTHER PUBLICATIONS

U.S. Appl. No. 12/563,460, filed Sep. 21, 2009. Applicants: Hiroyuki Muto, et al.

* cited by examiner

*Primary Examiner* — Thomas D Lee
*Assistant Examiner* — Stephen M Brinich
(74) *Attorney, Agent, or Firm* — Fitzpatrick, Cella, Harper & Scinto

(57) ABSTRACT

A first color patch printed on a first printing material and a second color patch printed on a second printing material, which match each other in appearance in a desired environment, are acquired. The calorimetric values of a color patch to be measured which is printed on the first printing material are corrected using the calorimetric values of the first and second color patches and a spectrophotometric calorimeter for obtaining calorimetric values in a desired environment, thereby generating effective calorimetric values.

5 Claims, 6 Drawing Sheets

COLORIMETRIC METHOD, COLORIMETRIC APPARATUS, AND RECORDING MEDIUM

BACKGROUND OF THE INVENTION

1. Field of the Invention

The present invention relates to a technique of measuring the color of a printing material containing a fluorescent brightener under a predetermined viewing illuminant.

2. Description of the Related Art

A color conversion table has conventionally been used to output a desired color from a printing apparatus. To create the color conversion table, a plurality of color patches are output to measure their colors. Then, various correction processes are performed so that a desired color can be expressed.

A general color patch measurement method is as follows. First, a spectral intensity distribution obtained by irradiating color patches with measurement light is divided by one obtained by irradiating a perfect reflecting diffuser with the measurement light. This yields an illuminant-independent spectral reflectance. Then, the tristimulus values of the color of a color patch under a given viewing illuminant are calculated as calorimetric values using the spectral reflectance, the spectrum of the viewing illuminant, and the color matching function.

[Patent Reference 1] Japanese Patent Laid-Open No. 2004-64112

However, many printing materials used to print contain a fluorescent brightener. The fluorescent brightener absorbs ultraviolet light and fluoresces in the visible range, visually enhancing brightness. A fluorescent brightener-containing printing material is readily affected by the illuminant. If measurement light used to measure color differs from an actual viewing illuminant, the emission amount of the fluorescent brightener changes, and an apparent spectral reflectance also changes. Consequently, an actual appearance differs from colorimetric values obtained by the colorimeter.

To solve this problem, there is proposed a method of measuring the color of a color patch with a spectral radiance meter under an actual viewing illuminant (patent reference 1). However, the spectral radiance meter is expensive and requires much effort to measure a color patch.

SUMMARY OF THE INVENTION

The present invention has been made to solve the above-described problems, and obtain colorimetric values matching the appearance by using a general spectrophotometric calorimeter when the color of a printed material containing a fluorescent brightener is measured under a predetermined viewing illuminant.

According to one aspect of the present invention, there is provided a colorimetric method of measuring a color printed on a printing material containing a fluorescent brightener under a predetermined viewing illuminant, using a computer to perform the steps of: an acquisition step of acquiring a first color patch and second color patch specified to match each other in appearance when a plurality of color patches formed on a printing material containing the fluorescent brightener and a plurality of color patches formed on a printing material free from the fluorescent brightener are compared under the predetermined viewing illuminant; a measurement step of performing colorimetric processing using spectrophotometric colorimetry for the first color patch and the second color patch to obtain a first calorimetric value and a second colorimetric value; and a colorimetric value correction step of correcting a colorimetric value output from a spectrophotometric calorimeter based on a relationship between the first calorimetric value and the second calorimetric value.

According to another aspect of the present invention, there is provided a colorimetric apparatus which measures a color printed on a printing material containing a fluorescent brightener under a predetermined viewing illuminant, the apparatus comprising: an acquisition unit which acquires a first color patch and second color patch specified to match each other in appearance when a plurality of color patches formed on a printing material containing the fluorescent brightener and a plurality of color patches formed on a printing material free from the fluorescent brightener are compared under the predetermined viewing illuminant; a measurement unit which performs colorimetric processing using spectrophotometric colorimetry for the first color patch and the second color patch to obtain a first calorimetric value and a second colorimetric value; and a calorimetric value correction unit which corrects a calorimetric value output from a spectrophotometric calorimeter based on a relationship between the first calorimetric value and the second colorimetric value.

Further features of the present invention will become apparent from the following description of exemplary embodiments with reference to the attached drawings.

DESCRIPTION OF THE EMBODIMENTS

An embodiment of the present invention will be described in detail below with reference to the accompanying drawings. The embodiment is merely an example of a configuration of the present invention set forth in the following claims, and the present invention should not be limited to the embodiment. Note that a color patch chart means a set of color patches arrayed in a matrix.

Figure 1:
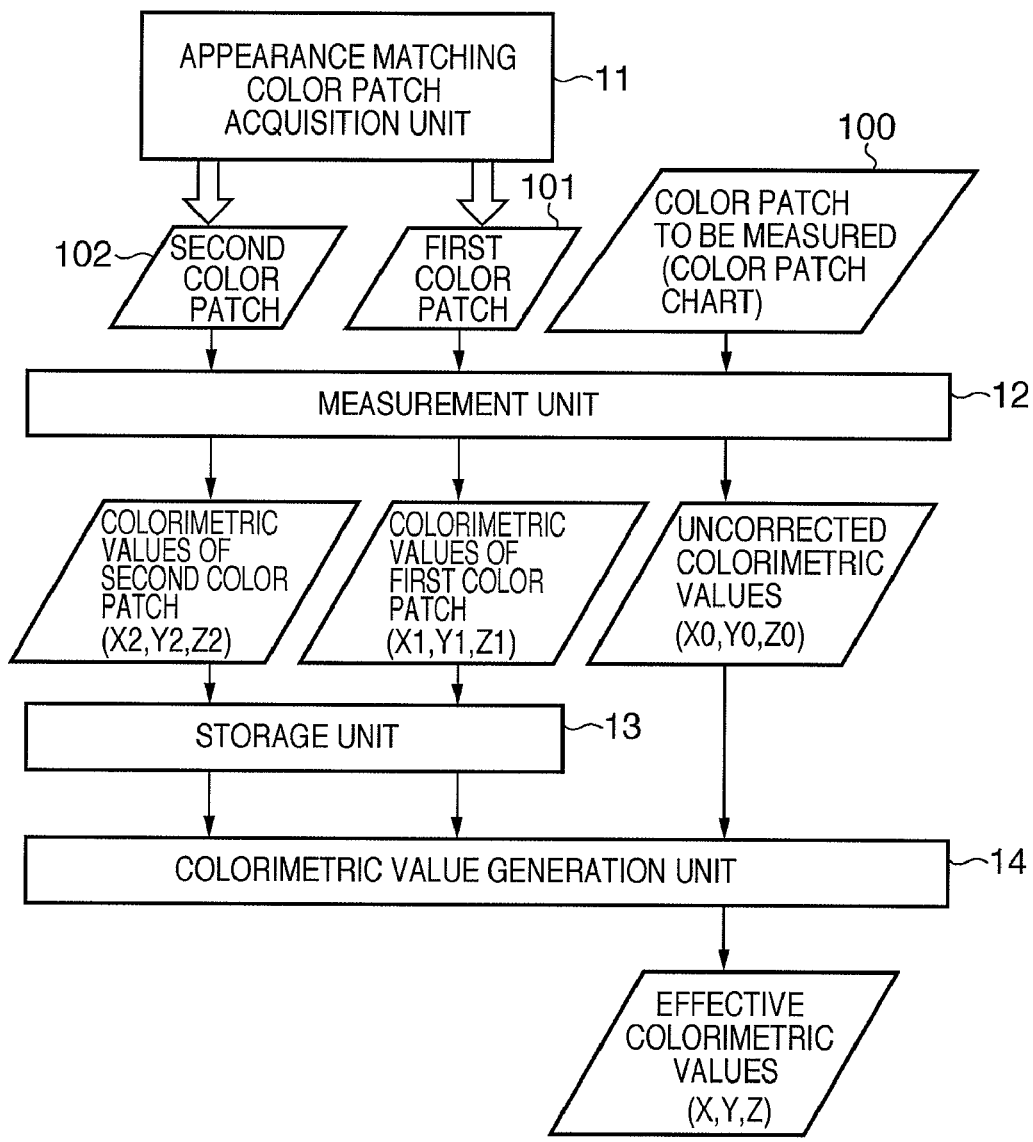
FIG. 1 is a block diagram of the arrangement of a calorimetric apparatus according to an embodiment of the present invention.

FIG. 1 is a block diagram showing the schematic arrangement of a colorimetric apparatus according to the embodiment of the present invention. The calorimetric apparatus includes an appearance matching color patch acquisition unit 11, measurement unit 12, storage unit 13, and calorimetric value generation unit 14.

The calorimetric apparatus according to the embodiment is implemented by advancing the function of profile creation software for outputting a profile creation chart, measuring its color, and creating a color matching profile. More specifically, the function of the appearance matching color patch acquisition unit is added to the profile creation software to create a profile which matches the appearance even in the use of a fluorescent brightener-containing printing material.

Figure 3:
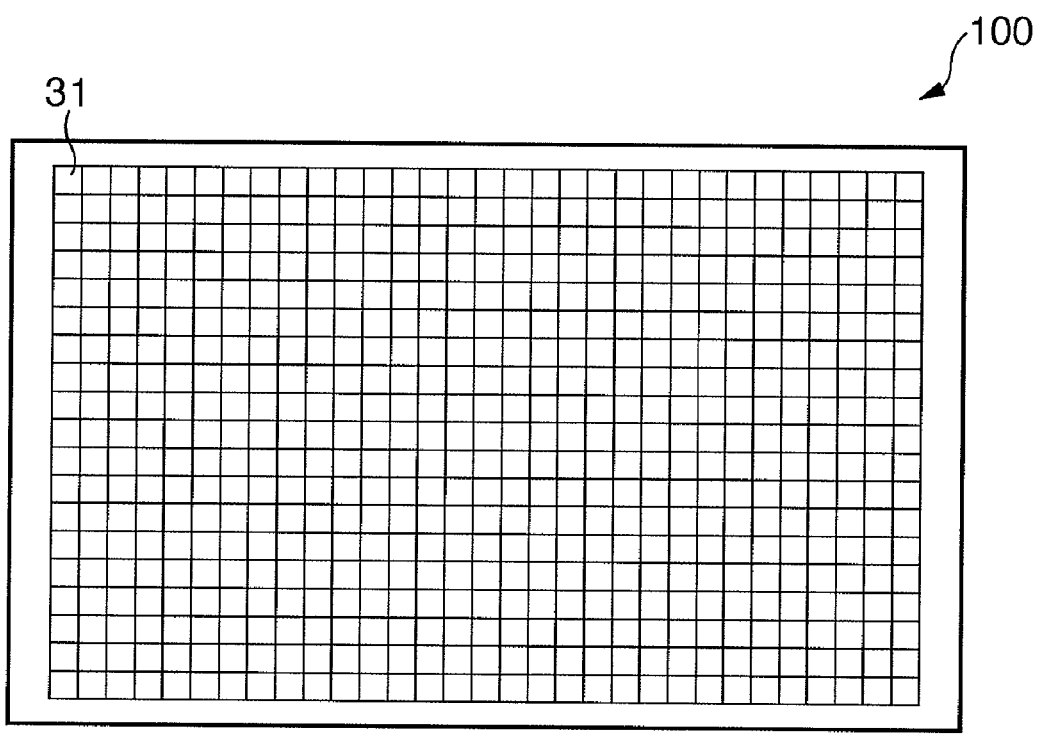
FIG. 3 is a view exemplifying a color patch chart to be measured.

There are three color patch charts output in the embodiment: a color patch chart to be actually measured (e.g., IT8 chart for creating a profile: FIG. 3), and a first chart (FIG. 5) and second chart (FIG. 6) used to search for appearance matching color patches. The color patch chart to be measured and the first chart are output on first printing materials though they are of different types. The color patch chart to be measured is not output on a second printing material.

Figure 4:
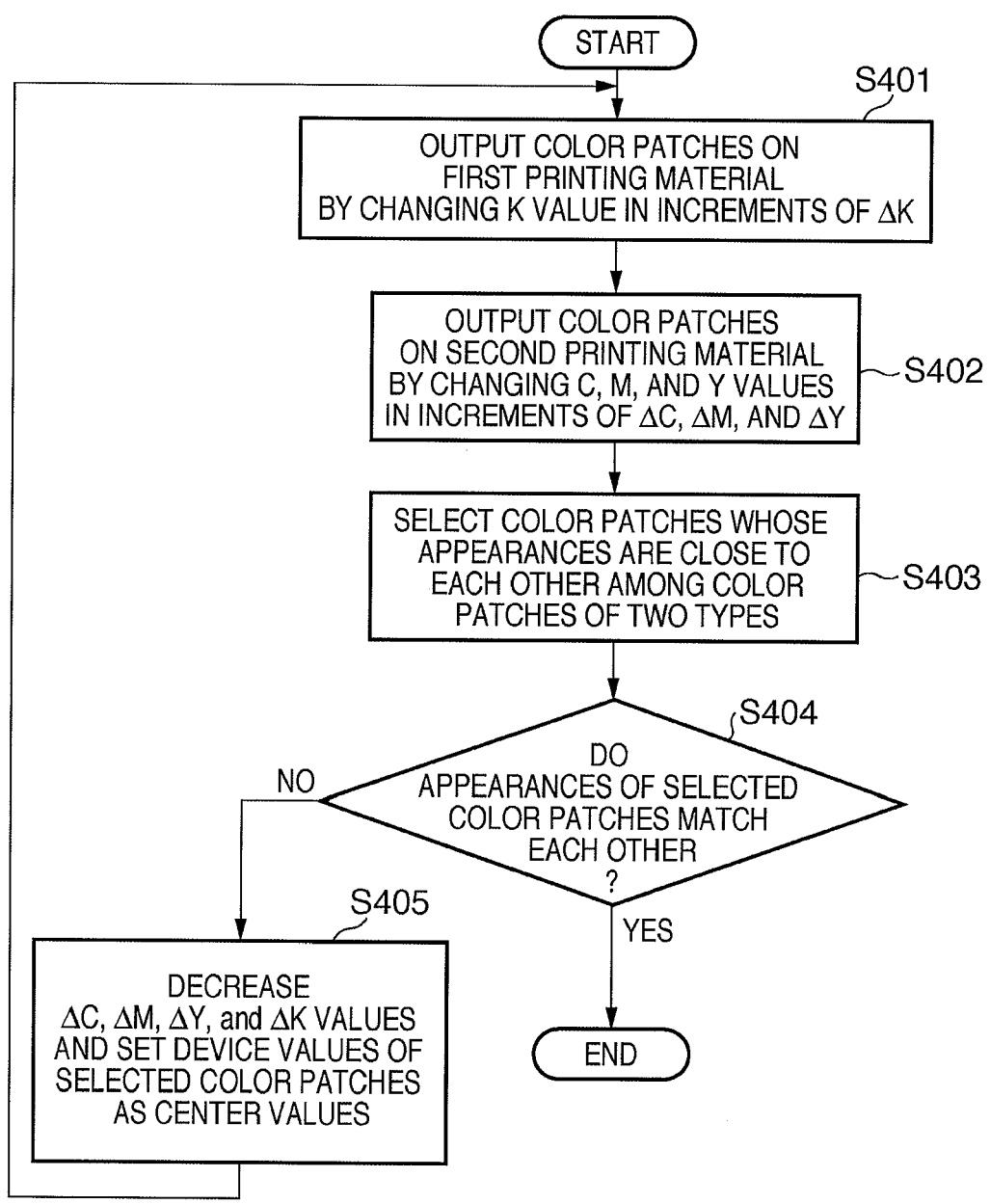
FIG. 4 is a flowchart showing processing to select color patches whose appearances match each other.

Preprocessing of calorimetric processing executed in the calorimetric apparatus will be explained with reference to FIG. 7. FIG. 4 is a flowchart showing the procedure of the preprocessing.

Figure 5:
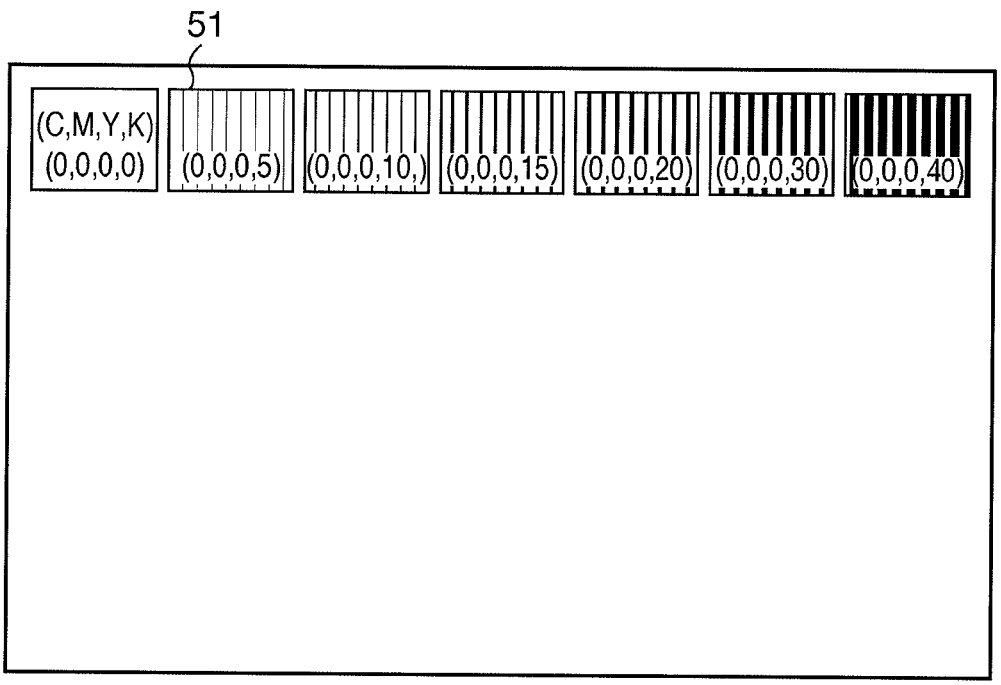
FIG. 5 is a view exemplifying a color patch chart printed on the first printing material.
Figure 6:
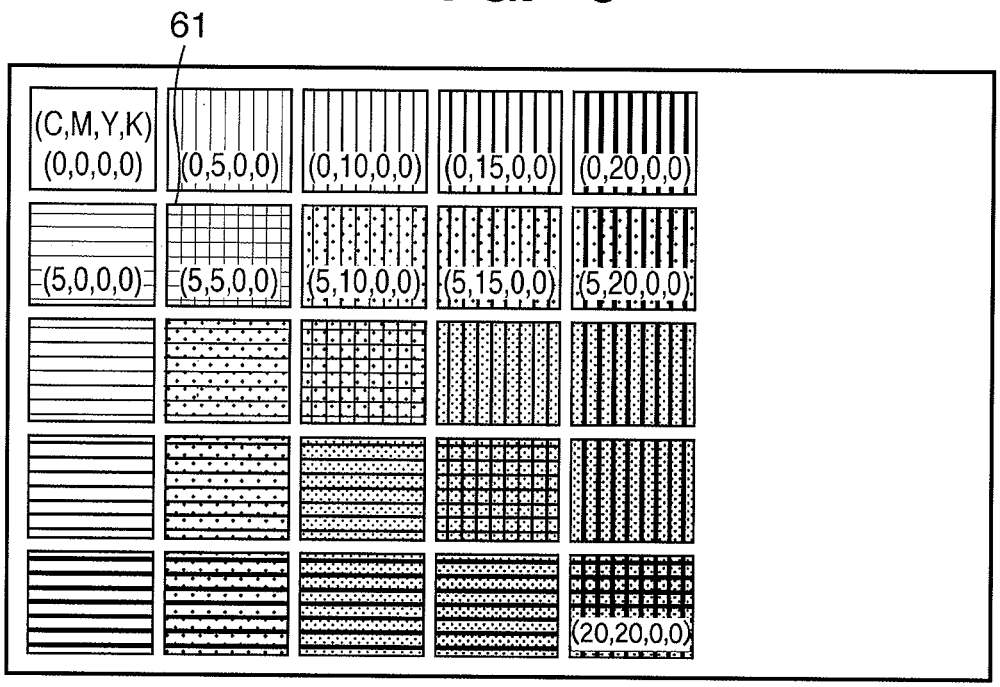
FIG. 6 is a view exemplifying a color patch chart printed on the second printing material.

Color patch charts are formed on printing materials of the two types by arraying a plurality of color patches as shown in FIGS. 5 and 6. One printing material is the first printing material containing a fluorescent brightener, and the other is the second printing material which contains no fluorescent brightener. The second printing material includes a printing material which contains a small amount of fluorescent brightener but can be regarded as not containing it. In other words, the first printing material containing the fluorescent brightener is a printing material containing a predetermined amount or more of fluorescent brightener. The second printing material free from the fluorescent brightener is a printing material containing less than the predetermined amount of fluorescent brightener.

In step S401, a plurality of color patches are printed on the first printing material by changing the K value from 0 in increments of $\Delta K$ while fixing the C, M, and Y values to 0, as shown in FIG. 5. A color patch chart including a plurality of color patches formed on the first printing material will be called the first chart.

In step S402, a plurality of color patches on gamut surfaces (primary and secondary colors) are printed on the second printing material by changing the C, M, and Y values in increments of $\Delta C$, $\Delta M$, and $\Delta Y$ while fixing the K value to 0, as shown in FIG. 6. A color patch chart formed on the second printing material will be called the second chart.

In steps S401 and S402, the same color patches may also be printed on the first and second printing materials and compared when color patches whose appearances match each other can be detected (converged). However, when the same color patches (e.g., a plurality of color patches formed by changing the C, M, and Y values in increments of $\Delta C$, $\Delta M$, and $\Delta Y$ while fixing the K value to 0) are output on both the first and second printing materials, the resultant charts change three-dimensionally, increasing the number of output color patches. This makes it difficult to distinguish color patches close in appearance. Since an appearance match occurs at a plurality of points (overlapping area of gamuts 71 and 73 in FIG. 7), it becomes difficult to converge the points. In view of this, the first chart is changed one-dimensionally while the second chart is changed two-dimensionally. This can decrease the number of output color patches. Points matching in appearance are uniquely determined and easily converged.

In step S403, the operator selects a pair of color patches which seem to have closest colors under a predetermined viewing illuminant among a plurality of color patches included in the first and second charts printed on the first and second printing materials. The selected color patch on the first printing material will be called a first color patch 101, and that on the second printing material will be called a second color patch 102. In the example of FIGS. 5 and 6, it can be determined that color patches 51 and 61 have closest colors.

In step S404, the operator determines whether the appearances of the selected color patches match each other. If their appearances do not match each other, the $\Delta C$, $\Delta M$, $\Delta Y$, and $\Delta K$ values are decreased in step S405, and the device values of the selected color patches are set as the center values of color patches to be created in steps S401 and S402.

The processes in steps S401 to S405 are repeated until color patches whose appearances completely match each other are specified. The specified color patches are set as the first color patch 101 and second color patch 102.

These processes will now be summarized. First, color patches which change by the first and second variations, respectively, are formed on a fluorescent brightener-containing printing material and a fluorescent brightener-free printing material (first and second formation steps). Then, information on the third color patch selected from a plurality of color patches on the fluorescent brightener-containing printing material, and the fourth color patch selected from a plurality of color patches on the fluorescent brightener-free printing material are acquired (first and second acquisition steps).

Further, color patches which change by variations smaller than the first and second variations are formed around the acquired third and fourth color patches serving as centers on the fluorescent brightener-containing printing material and fluorescent brightener-free printing material (third and fourth formation steps). The first and second color patches specified to match each other in appearance are acquired from the formed color patches (third and fourth acquisition steps).

Figure 7:
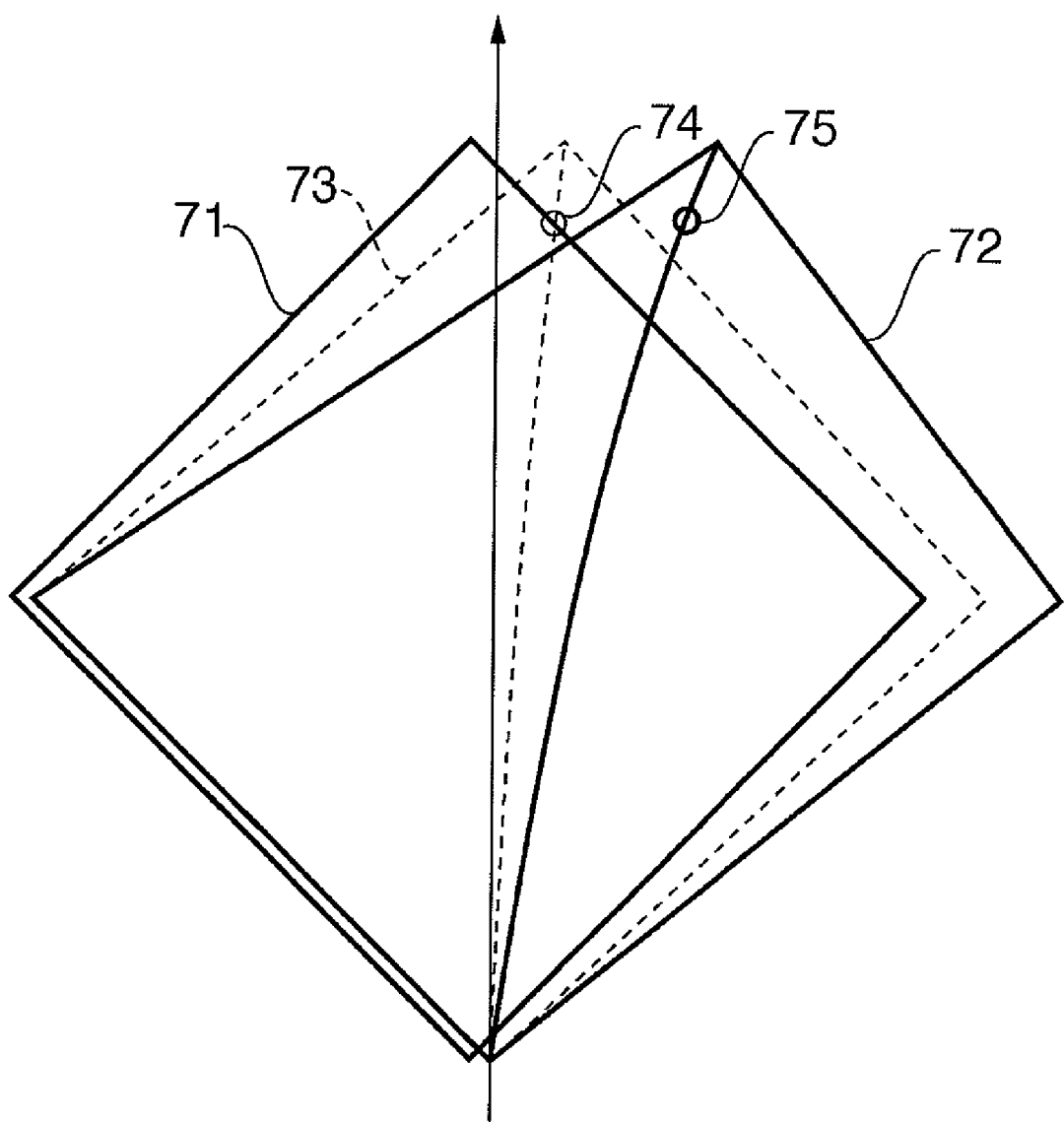
FIG. 7 is a conceptual view of an appearance matching color patch acquisition unit.

FIG. 7 is a conceptual view of the above-described processing of the appearance matching color patch acquisition unit 11. The longitudinal direction represents the brightness, and the lateral direction represents the saturation. The gamut 71 exhibits the calorimetric values of the second printing material, and a gamut 72 exhibits those of the first printing material. The appearance gamut 73 of the first printing material is obtained under a viewing illuminant. The series of processes in FIG. 4 search for an intersection point 74 between the gamut surface of the gamut 71 of the calorimetric values of the second printing material and the gray line of the appearance gamut 73 of the first printing material under the viewing illuminant. In this case, color patches may be specified by numbering them and inputting target numbers. The color charts in FIGS. 5 and 6 may also be displayed in a UI to select color patches with a mouse or the like.

Figure 2:
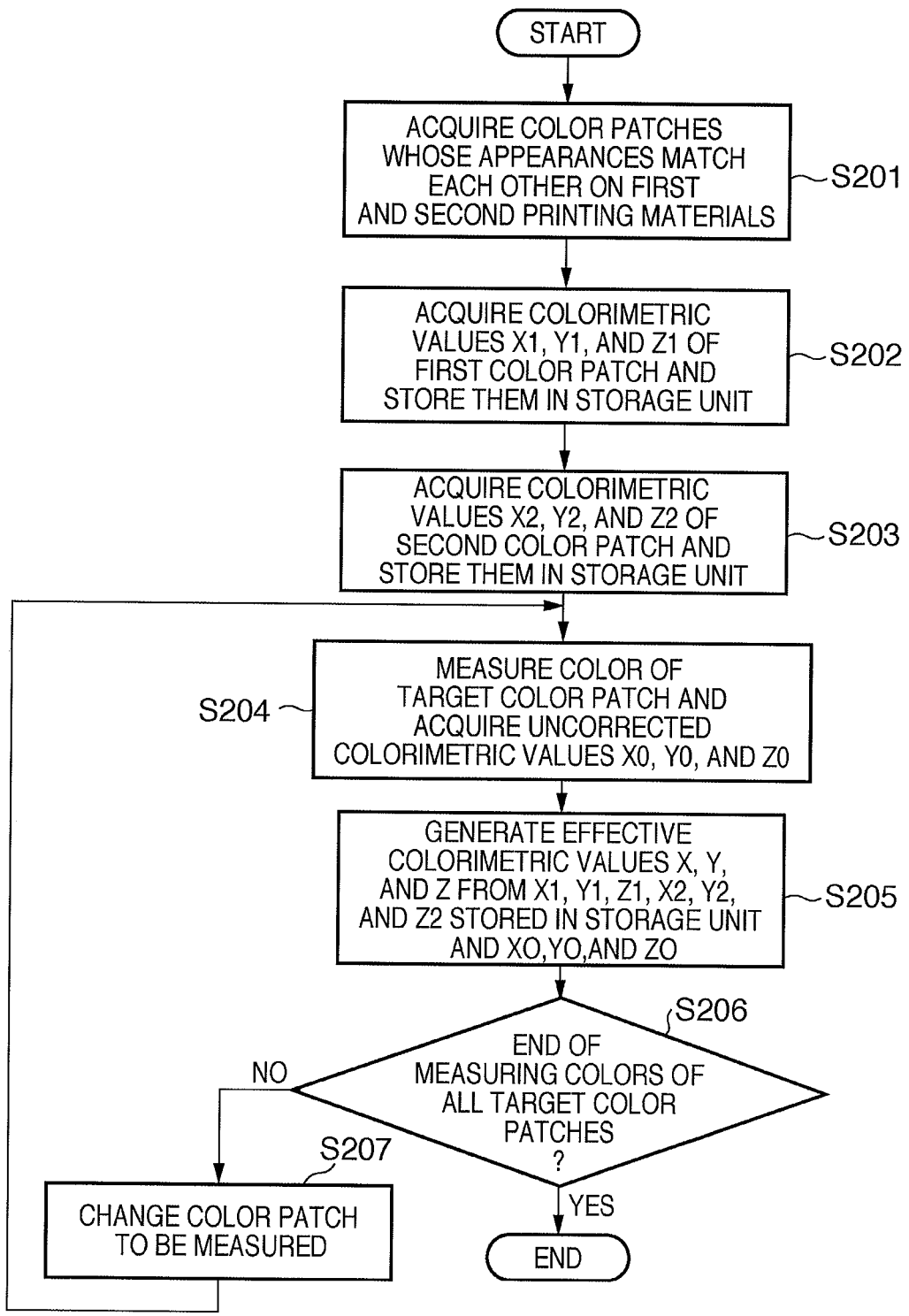
FIG. 2 is a flowchart showing an outline of calorimetric processing in the calorimetric apparatus according to the embodiment of the present invention.

FIG. 2 is a flowchart showing colorimetric processing executed in the calorimetric apparatus. In step S201 of FIG. 2, the appearance matching color patch acquisition unit 11 acquires the first color patch 101 and second color patch 102.

In step S202, the measurement unit 12 measures the color of the first color patch 101 to acquire first calorimetric values $X_1$, $Y_1$, and $Z_1$ and store them in the storage unit 13. The measurement unit 12 attains the calorimetric values of a color patch under an actual viewing illuminant based on a spectral reflectance obtained by a spectrophotometric calorimeter, the spectrum of a viewing illuminant obtained by an ambient light sensor, and the color matching function.

In step S203, the measurement unit 12 measures the color of the second color patch 102 to acquire second calorimetric values $X_2$, $Y_2$, and $Z_2$ and store them in the storage unit 13.

In step S204, the measurement unit 12 measures the color of one color patch of a color patch chart 100 which is an array of color patches printed on the first printing material as shown in FIG. 3, thereby acquiring uncorrected calorimetric values $X_0$, $Y_0$, and $Z_0$.

In step S205, the calorimetric value generation unit 14 corrects the uncorrected calorimetric values $X_0$, $Y_0$, and $Z_0$ based on the relationship between the first calorimetric values $X_1$, $Y_1$, and $Z_1$ and second calorimetric values $X_2$, $Y_2$, and $Z_2$ that are stored in the storage unit 13, thereby generating effective calorimetric values $X$, $Y$, and $Z$. More specifically, the calorimetric value generation unit 14 receives the uncorrected calorimetric values X0, Y0, and Z0 of a target color patch measured by the measurement unit 12, and outputs the effective calorimetric values X, Y, and Z using the relationship between the first calorimetric values X1, Y1, and Z1 and the second calorimetric values X2, Y2, and Z2. For example, the calorimetric value generation unit 14 adopts $$X=(X2/X1)\times X0$$

$$Y=(Y2/Y1)\times Y0$$

$$Z=(Z2/Z1)\times Z0$$

The processes in steps S204 and S205 are repeated for all the color patches of the color patch chart 100.

As described above, according to the embodiment, two, first and second color patches whose appearances match each other in an actual environment are acquired. The calorimetric values of a color patch to be measured that is printed on the first printing material are corrected based on the calorimetric values of the first and second color patches, generating effective calorimetric values. Hence, even when the color of a printed medium containing a fluorescent brightener is measured under a predetermined viewing illuminant, a general spectrophotometric calorimeter can obtain calorimetric values matching the appearance.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-220497 filed Aug. 28, 2008 which is hereby incorporated by reference herein in its entirety.

What is claimed is:

1. A colorimetric method of measuring a color printed on a printing material containing a fluorescent brightener under a predetermined viewing illuminant, using a computer to perform the steps of:
    an acquisition step of acquiring a first color patch and second color patch specified to match each other in appearance when a plurality of color patches formed on a printing material containing the fluorescent brightener and a plurality of color patches formed on a printing material free from the fluorescent brightener are compared under the predetermined viewing illuminant;
    a measurement step of performing colorimetric processing using spectrophotometric colorimetry for the first color patch and the second color patch to obtain a first colorimetric value and a second colorimetric value; and
    a colorimetric value correction step of correcting a colorimetric value output from a spectrophotometric colorimeter based on a relationship between the first colorimetric value and the second colorimetric value.

2. The method according to claim 1, wherein the acquisition step comprises
    a first formation step of forming, on a printing material containing the fluorescent brightener, a plurality of color patches which change by a first variation,
    a second formation step of forming, on a printing material free from the fluorescent brightener, a plurality of color patches which change by a second variation,
    a first acquisition step of acquiring information on a third color patch selected from the plurality of color patches formed on the printing material containing the fluorescent brightener in the first formation step,
    a second acquisition step of acquiring information on a fourth color patch selected from the plurality of color patches formed on the printing material free from the fluorescent brightener in the second formation step,
    a third formation step of forming, around the third color patch serving as a center that has been acquired in the first acquisition step on the printing material containing the fluorescent brightener, a plurality of color patches which change by a variation smaller than the first variation,
    a fourth formation step of forming, around the fourth color patch serving as a center that has been acquired in the second acquisition step on the printing material free from the fluorescent brightener, a plurality of color patches which change by a variation smaller than the second variation,
    a third acquisition step of acquiring the first color patch selected from the plurality of color patches formed in the third formation step, and
    a fourth acquisition step of acquiring the second color patch selected from the plurality of color patches formed in the fourth formation step.

3. The method according to claim 1, wherein the printing material containing the fluorescent brightener includes a printing material containing not less than a predetermined amount of fluorescent brightener, and the printing material free from the fluorescent brightener includes a printing material containing less than the predetermined amount of fluorescent brightener.

4. A colorimetric apparatus which measures a color printed on a printing material containing a fluorescent brightener under a predetermined viewing illuminant, the apparatus comprising:
    an acquisition unit which acquires a first color patch and second color patch specified to match each other in appearance when a plurality of color patches formed on a printing material containing the fluorescent brightener and a plurality of color patches formed on a printing material free from the fluorescent brightener are compared under the predetermined viewing illuminant;
    a measurement unit which performs colorimetric processing using spectrophotometric colorimetry for the first color patch and the second color patch to obtain a first colorimetric value and a second colorimetric value; and
    a colorimetric value correction unit which corrects a colorimetric value output from a spectrophotometric colorimeter based on a relationship between the first colorimetric value and the second colorimetric value.

5. A non-transitory computer-readable storage medium storing a program for causing a computer to execute steps included in a colorimetric method defined in claim 1.

* * * * *